(12) United States Patent
Walton

(10) Patent No.: US 7,667,870 B1
(45) Date of Patent: Feb. 23, 2010

(54) WHITE REGION IDENTIFICATION TO ACCELERATE IMAGE PROCESSING FOR COPIES

(75) Inventor: Derek T. Walton, Bolton, MA (US)

(73) Assignee: Conexant Systems, Inc., Newport Beach, CA (US)

( * ) Notice: Subject to any disclaimer, the term of this patent is extended or adjusted under 35 U.S.C. 154(b) by 732 days.

(21) Appl. No.: 11/032,635

(22) Filed: Jan. 10, 2005

Related U.S. Application Data

(60) Provisional application No. 60/535,397, filed on Jan. 9, 2004.

(51) Int. Cl.
*G06F 15/00* (2006.01)
*G06K 1/00* (2006.01)

(52) U.S. Cl. .................. 358/1.9; 358/1.1; 358/1.18

(58) Field of Classification Search .......... 358/1.1, 358/1.9, 3.06, 1.18, 401, 426.01, 426.06, 358/448, 464, 486
See application file for complete search history.

(56) References Cited

U.S. PATENT DOCUMENTS

| | | | | | |
|---|---|---|---|---|---|
| 3,643,016 | A | * | 2/1972 | Dattilo | 358/438 |
| 5,539,537 | A | * | 7/1996 | Nozawa | 358/486 |
| 5,689,294 | A | * | 11/1997 | Karz et al. | 347/40 |
| 5,923,820 | A | * | 7/1999 | Cunnagin et al. | 358/1.8 |
| 6,016,205 | A | * | 1/2000 | Silverberg et al. | 358/1.6 |
| 6,257,698 | B1 | * | 7/2001 | Bloomberg et al. | 347/40 |
| 6,302,520 | B1 | * | 10/2001 | Akiyama et al. | 347/43 |
| 6,407,824 | B1 | * | 6/2002 | Hashimoto | 358/1.9 |
| 2004/0046761 | A1 | * | 3/2004 | Hellman et al. | 345/502 |

* cited by examiner

*Primary Examiner*—Thomas D Lee
(74) *Attorney, Agent, or Firm*—John R. Thompson; Stoel Rives LLP

(57) ABSTRACT

The present invention solves the problem set forth above by providing a method for accelerating the production of a standalone copy of a document by a peripheral device. The invention employs a white space map of the document to be copied. The map is generated by the ASIC chip and is used by the device to identify areas of the outputted copy that do not require ink or toner. This reduces the processing resources necessary to print the copy, thus speeding up copy production.

15 Claims, No Drawings

WHITE REGION IDENTIFICATION TO ACCELERATE IMAGE PROCESSING FOR COPIES

REFERENCE TO PENDING PRIOR PATENT APPLICATION

This patent application claims benefit of prior U.S. Provisional Patent Application Ser. No. 60/535,397, filed Jan. 9, 2004 by Derek T. Walton for WHITE REGION IDENTIFICATION TO ACCELERATE IMAGE PROCESSING FOR COPIES.

The above-identified patent application is hereby incorporated herein by reference.

FIELD OF THE INVENTION

This invention relates to office automation products in general, and more particularly to printers, fax machines, scanners, copiers and the like. Even more particularly, this invention relates to the integration of formerly separate functions into single devices such as those sometimes referred to as MFPs (Multi-Functional-Peripherals), and the integration of multiple functions into a single ASIC (Application-Specific Integrated Circuit) such as those produced by Oasis Semiconductor, Inc. of Waltham, Mass.

BACKGROUND OF THE INVENTION

Image Processing For Copies

Performing a standalone copy on a peripheral device requires sophisticated and computationally complex processing. Typically, the input for the copy is raw analog or digitized values from an image sensing device. The output of the copy processing is typically either: (1) a raster ordered set of bitonal pixels, which can be delivered directly to a laser (as in the case of a toner based laser engine) for creation of an image on an output media; or (2) a collection of "swaths" of bitonal pixels which is derived from the raster ordered set by an inkjet formatter, which, taken together with paper feed operations, create an image on output media (as in the case of an ink jet engine).

The processing performed to transform input to output for the copy operation typically consists of the following steps:

(1) Black level and shading correction (compensates for non-uniformity of sensor elements);

(2) Gamma correction;

(3) Photo/text separation;

(4) Filtering;

(5) Horizontal and vertical scaling;

(6) Contrast and brightness adjust;

(7) Color space conversion (for instance, RGB→CMYK);

(8) Compensation for tonal response of writing system;

(9) Halftoning (for instance, converts 8 bit continuous tone components into 1 bit bitonal components); and

(10) Ink jet formatting (reorganizes raster image data into swaths suitable for target ink jet heads, not applicable for laser based print engines).

For a particular peripheral device, particularly a multifunctional peripheral device ("MFP"), the speed in which the above computations to convert input to output can be performed will influence the speed with which the device can perform a standalone copy. Alternatively, consider that in order to meet a particular copy speed, it is necessary to allocate resources (hardware, CPU time or otherwise) to ensure that the above computations can be performed in the prescribed time period.

Prior Approaches (1) Perform all Processing, for Entire Page, for each Copy

One approach to image processing for copying is to perform all of the processing, for the entire input and output image for each copy to be performed. This of course requires that the full computational load be shouldered for each copy.

(2) Perform all Processing, for Entire Page, But "Scan Once, Print Many"

A simple optimization of the above brute force approach is possible for the case that multiple copies of the same input page is desired. In this case, the scan operation, and a subset of the image processing operations, need only be performed once. The partially transformed input image can be stored in memory. From this memory store, multiple print copies can be achieved by repeatedly performing the remaining processing and print operations.

With this approach, it is not necessary to perform all of the image processing for each output page printed. This can speed the output printing process and/or reduce the computation load.

A disadvantage of this approach is that it is often prohibitively expensive to include enough memory in the MFP to ensure that the partially processing page fit within memory.

Goals

Accordingly, there is a need for a method of speeding up image processing in standalone copy production without increasing the computational load on the device. Computer chips that can achieve such an improvement are needed.

SUMMARY OF THE INVENTION

The present invention solves the problem set forth above by providing a method for accelerating the production of a standalone copy of a document by a peripheral device. The invention employs a white space map of the document to be copied. The map is generated by the ASIC chip, preferably at an early stage in the processing pipeline, and is used by the device to identify white areas of the outputted copy that do not require subsequent image processing calculations and do not require ink or toner markings on the paper. Use of the white space map allows the system to reduce the processing resources necessary to image process and subsequently physically print the copy, thus speeding up copy production.

In one preferred form of the invention, there is provided a method for accelerating the production of a standalone copy of a document by a peripheral device comprising the steps of:

a. generating a white space map from a post-halftone raster image of said document, wherein said white space map comprises rectangular regions of said image, and wherein each of said regions are characterized as requiring or not requiring any ink or toner; and b. using said white space map prior to producing said copy to determine if ink or toner can be omitted in portions of said produced copy.

In one preferred form of the invention, there is provided a method for producing a standalone copy of a document by a peripheral device comprising the steps of:

a. employing an image sensor to obtain pixel data from said document to be copied;

b. determining whether each pixel is white;

c. generating a white space map from the determination made in step b, wherein said white space map comprises rectangular regions of said image, and wherein each of said regions are characterized as requiring or not requiring any ink or toner; and d. utilizing said map to control the production of said copy.

In another preferred form of the invention, there is provided a computer chip capable of controlling image processing for the production of a standalone copy of a document by a peripheral device, wherein said chip controls:

a. the generation of a white space map from a post-halftone raster image of said document, wherein said white space map comprises rectangular regions of said image, and wherein each of said regions are characterized as requiring or not requiring any ink or toner; and b. the use of said white space map prior to producing said copy to determine if ink or toner can be omitted in portions of said produced copy.

In another preferred form of the invention, there is provided a computer chip capable of controlling image processing for the production of a standalone copy of a document by a peripheral device, wherein said chip controls:

a. an image sensor to obtain pixel data from said document to be copied;

b. the determination of whether each pixel is white;

c. the generating of a white space map based upon the determination made in b, wherein said white space map comprises rectangular regions of said image, and wherein each of said regions are characterized as requiring or not requiring any ink or toner; and d. the use of said map to control the production of said copy.

In another preferred form of the invention, there is provided a method for accelerating the production of a standalone copy of a document by a peripheral device comprising the steps of:

a. generating a white space map from a raster image of said document, wherein said white space map comprises rectangular regions of said image, and wherein each of said regions are characterized as requiring or not requiring any ink or toner; and b. using said white space map prior to producing said copy to determine if ink or toner can be omitted in portions of said produced copy.

DETAILED DESCRIPTION OF THE PREFERRED EMBODIMENTS

The present invention solves the problem set forth above by providing a method for accelerating the production of a standalone copy of a document by a peripheral device. The invention employs a white space map of the document to be copied. The map is generated by the ASIC chip and is used by the device to identify areas of the outputted copy that do not require ink or toner. This reduces the processing resources necessary to print the copy, thus speeding up copy production.

Omit Ink Jet Formatting for Regions Detected as White After Halftone

The ASIC can be configured to include the ability to create a "white space map" at the same time as the halftone processing step is performed in the standalone copy production process. This white space map is a low resolution image generated from the post-halftone raster image. Each location in the white space map corresponds to a region within the post-halftone raster image. The size of the region is programmable. Each location within the white space map indicates whether or not there is any toner/ink called for within the associated region of the post-halftone raster image.

The white space map can be used to accelerate the ink jet formatting process. In the case of an ink jet-based device, the formatter, by consulting the white space map prior to performing the work to generate a swath, can either: (1) determine that the entire swath can be omitted (no pixels on the entire swath); or (2) limit the extent of the swath (recognizing that white regions exist on the left and/or right sides of the swath).

This white space map based technique represents a great improvement for ink jet copier systems because an ink jet engine is very quick to print white regions (i.e., no printing passes are required, just paper feed). In order to keep up with an ink jet printer in white regions, a formatter without white space map based acceleration would need very high computational throughput. With white space map based acceleration, the formatter computing capacity can be sized for the more modest demands of ink jet print engine speed during non-white regions.

This white space map based technique is particularly useful when combined with the "scan once, print many" technique, as typically the ink jet formatting task is performed for each of the output printed pages.

In the preferred embodiment of the invention, the generation of the white space map is performed at the beginning of the computation pipeline while the input pixel data is being received from the image sensor. This allows the bulk of the image processing to be omitted from white regions, which improves the copy performance and/or reduces the hardware resources.

Preferred Embodiment

In the preferred embodiment of this invention, the pixel input pipeline of the chip controlling the image processing process (which receives input data from sensor, performs black/shading correction, gamma correction, and writes the resultant RGB pixels to memory) has been extended to include logic which is capable of identifying white regions.

The logic consists of a triplet of R, G and B limit registers and a triplet of detection arrays (one for R, one for G and one for B). The detection arrays are organized such that each element in the array corresponds to a particular horizontal region of the input image. Each element in the detection arrays and can take on a value of 0 or 1. A value of 1 indicates that the region is all white, while a value of 0 indicates that the region is NOT all white. When image scanning first begins, the detection array elements are initialized to 1 to indicate that the regions are all white. As post gamma-corrected pixel components are received, they are compared with the limit registers. If a pixel component is determined to be darker than its respective limit value, the associated element in the detection array is cleared to 0 to indicate that the region is NOT all white. The width and height in pixels associated with each detection array element is programmable. Firmware completes the process of generating a "white space map" equivalent by copying the detection array values to image memory at intervals corresponding to the height of the detection regions. Each time firmware completes copying the detection array element values to image memory, the array elements are again initialized to 1 to indicate that the regions are all white.

Once the white space map has been generated for a vertical region of an image, it can be used to control the downstream image processing and printing tasks for the region in a manner which minimizes resource use. For the image processing pipeline of our example, white space maps generated from post gamma-corrected pixels identify white regions of the image which do not need to pass through steps 3 through 9 of the image processing pipeline (i.e., photo/text separation, filtering, horizontal and vertical scaling, contrast and brightness adjust, color space conversion, compensation for tonal response, and halftoning). This reduction in image processing computation applies universally to all types of print engines (i.e., ink jet printers, laser printers, etc.)

For ink jet engines, the white space map can also be used to accelerate the ink jet formatting process (step 10 in our example). The formatter, by consulting the white space map prior to performing the work to generate a swath, can either: (1) determine that the entire swath can be omitted (no pixels on the entire swath); or (2) limit the extent of the swath (recognizing that white regions exist on the left and/or right sides of the swath).

This white space map based technique represents a great improvement for ink jet copier systems because an ink jet engine is very quick to print white regions (i.e., no printing passes are required, just paper feed). In order to keep up with an ink jet printer in white regions, a formatter without white space map based acceleration would need very high computational throughput. With white space map based acceleration, the formatter computing capacity can be sized for the more modest demands of ink jet print engine speed during non-white regions.

This white space map based technique is particularly useful when combined with the "scan once, print many" technique, as typically the ink jet formatting task is performed for each of the output printed pages.

It should be appreciated that it is also possible to position the white map generation logic at other positions within the image processing pipeline than the position indicated in our example. For instance, with adjustment of the values programmed into the limit registers, it is possible to locate the white map generation prior to gamma correction. Positioning the white map generation downstream of the gamma correction logic is also possible, although such a positioning would sacrifice some of the performance benefit of the white maps in that fewer image computations would be skipped for white areas.

It should also be appreciated that the white map method for acceleration of image processing for copies described in the invention applies in general to all copy image processing pipelines, and not just to the specific set and order of image processing operations making up the image processing pipeline described above.

It should also be appreciated that it is not necessary for the entire white space map to be available prior to beginning the image processing task. Rather, it is possible to take advantage of the white space map as portions of the white space map become available to effect processing for the associated regions of the document; other portions of the white space map may subsequently be generated for other regions of the document. In a preferred construction, the white space map is used "on the fly", i.e., earlier-generated portions of the white space map are used for image processing as subsequent portions of the white space map are being generated.

What is claimed is:

1. A method for producing a standalone copy of a document by a peripheral device, the method comprising:
    employing an image sensor to obtain pixel data from said document to be copied, the image sensor comprising detection arrays, wherein each element in the detection arrays can take on a binary value;
    determining whether each pixel is white by using limit values set forth in limit registers corresponding to the detection arrays;
    generating a white space map from the determination of whether each pixel is white, wherein said white space map comprises rectangular regions of said image, and wherein each of said rectangular regions is characterized as requiring or not requiring any ink or toner; and
    utilizing said white space map to control the production of said copy.

2. A method according to claim 1 wherein said peripheral device is a multifunctional peripheral device.

3. A method according to claim 2 wherein said multifunctional peripheral device is an ink jet device.

4. A method according to claim 3 wherein the image sensor comprises a red detection array, a green detection array and a blue detection array; and wherein each element in each array detects a horizontal region of the document, wherein a size of said horizontal region is programmable.

5. A method according to claim 4 wherein the pixel determination comprises determining that a pixel is not darker than a limit value set forth in corresponding red, green and blue limit registers.

6. A method according to claim 5 wherein said white space map is generated by firmware by copying the detection array values to image memory at intervals corresponding to the height of said horizontal detection regions.

7. A computer device capable of controlling image processing for the production of a standalone copy of a document by a peripheral device, wherein said computer device controls:
    an image sensor to obtain pixel data from said document to be copied, the image sensor comprising detection arrays, wherein each element in the detection arrays can take on a binary value;
    the determination of whether each pixel is white by using limit values set forth in limit registers corresponding to the detection arrays;
    the generating of a white space map based upon the determination of whether each pixel is white, wherein said white space map comprises rectangular regions of said image, and wherein each of said rectangular regions is characterized as requiring or not requiring any ink or toner; and
    the use of said white space map to control the production of said copy.

8. A computer device according to claim 7 wherein said image sensor comprises a red detection array, a green detection array and a blue detection array; and wherein each element in each array detects a horizontal region of the document, wherein a size of said horizontal region is programmable.

9. A computer device according to claim 8 wherein said device comprises logic that compares a pixel value obtained from said red, green and blue detection arrays with a corresponding red, green or blue limit register to determine if said pixel is white.

10. A computer device according to claim 9 wherein said white space map is generated by firmware by copying the detection array values to image memory at intervals corresponding to the height of said horizontal detection regions.

11. A method for accelerating the production of a standalone copy of a document by a peripheral device, the method comprising:
    generating a white space map from a raster image of said document by employing an image sensor to obtain pixel data from said document to be copied, the image sensor comprising detection arrays, wherein each element in the detection arrays can take on a binary value, and determining whether each pixel is white by using limit values set forth in limit registers corresponding to the detection arrays, wherein said white space map comprises rectangular regions of said raster image, and wherein each of said rectangular regions is characterized as requiring or not requiring any ink or toner; and using said white space map prior to producing said copy to determine if ink or toner can be omitted in portions of said produced copy.

12. A method according to claim 11 wherein said white space map is generated prior to halftoning.

13. A method according to claim 11 wherein said white space map is generated after black level and shading correction and before halftoning.

14. A method according to claim 11 wherein said white space map is generated after gamma correction and before halftoning.

15. A method according to claim 11 wherein the white space map and image processing occur in tandem, and further wherein latter portions of the white space map are being generated even as image processing is being effected using previously generated portions of the white space map.

* * * * *